Figures 1, 2:
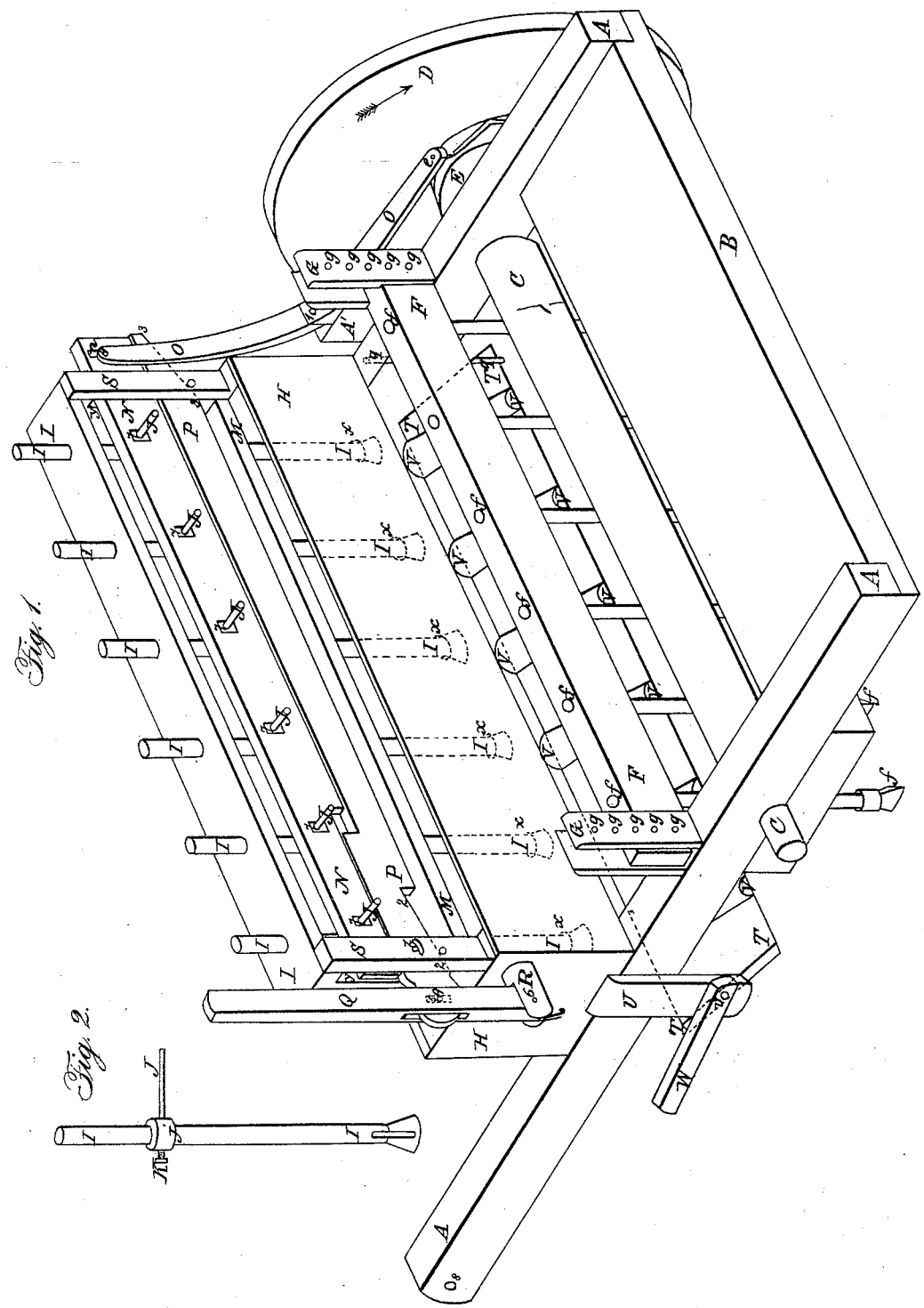

J. CRITCHERSON.
Grain-Drill.

No. 18,881.

Patented Dec. 15, 1857.

UNITED STATES PATENT OFFICE.

JOHN CRITCHERSON, OF BOSTON, MASSACHUSETTS, ASSIGNOR TO JOHN WARREN, OF SAME PLACE.

IMPROVEMENT IN SEEDING-MACHINES.

Specification forming part of Letters Patent No. 18,881, dated December 15, 1857.

*To all whom it may concern:*

Be it known that I, JOHN CRITCHERSON, of Boston, in the county of Suffolk and Commonwealth of Massachusetts, have invented a new and useful Drill and Broadcast-Seeding Machine; and I do hereby declare that the following is a full, clear, and exact description of the construction and operation of the same, reference being had to the accompanying drawings, forming a part of this specification.

Similar letters refer to like parts in both figures.

The nature of my invention consists in the use of fluted conical valves, in giving said valves a vibratory motion to agitate the seed, in the method of simultaneously raising or depressing said valves in order to regulate the amount of seed discharged, and in making the pin J, (see Fig. 2,) which imparts the vibratory motion to the valve, adjustable by means of the collar $j$ and set-screw K, so that more or less of the valves may be made to operate and any one of them may be readily adjusted independently of the others, if desirable.

To enable others skilled in the art to make and use my invention, I will proceed to describe its construction and operation.

A A A and B are the frame-work of the carriage. In a large machine the pieces A A are twelve or fifteen feet apart, more or less. To the platform B may be attached a pole or thills, by which to draw the machine.

C is the axle, with one wheel off, for the sake of showing the seeding apparatus more distinctly in a perspective view.

E is a cam-wheel fast to the wheel D and revolving with it.

F is the beam, which carries the plows $f f f$, &c., and which may be raised or lowered in the slots of posts G G, and held in place by means of pins passing through holes $g g$ in said posts. In broadcast sowing these plows may be raised so as not to touch the ground or taken entirely out and laid aside.

H H is the seed box or hopper, in the bottom of which is a series of round holes, X X X, for the conical valves I I I to work in. These holes may be either cut in the wooden bottom of the hopper, or (what is better still) in thin plates of iron, which may be afterward secured to the bottom.

I I I are the valves, the lower ends of which are conical. These valves are kept in place by passing through round holes in the slats M M and L L. The lower ends are also fluted, as seen in Fig. 2, $i$ being a groove commencing near the bottom and running up, as represented. The use of these grooves is to allow a smaller quantity of seed to pass when sowing in drills than would naturally pass were the seed permitted to drop through the entire circumference of the cone between it and the edge of the hole, whereas by raising the cone sufficiently high it will fit so closely in the hole that the seed can pass only through the groove $i$; or, again, as the groove $i$ does not extend to the bottom of the cone, the latter may be raised so high as to prevent any seed whatever from passing through.

J is a pin fast in collar $j$, which collar may be fastened to the valve-rod I at any desirable point by means of the set-screw K. By the same means it is also obvious that any one or more of the valves may be held in such a position as not to allow any seed to pass while the others are open. It also affords an easy method of adjusting the valves in case the bottom of the seed-box should warp or bend.

N N is a slat, which is caused to vibrate in the slots $y y$ of the frame S S by means of the cam E, pin $e$, lever O, fulcrum 1, and pin 4, which latter passes through the vertical slot $n$. In this slat N N are square holes 7 7 7, &c., through which the pins J pass, and by which they are supported and made to vibrate, thereby communicating the requisite vibratory motion to the conical valves.

P P is another slat, the two ends of which, where they pass through the slots $y y$, are wedge-shaped, as seen in Fig. 1 at 2 2 and 3 3; and as the slat N N slides on the top of P P it obvious that by elevating or depressing P P the valves I I will also be elevated or depressed.

Z is a set screw to confine the slat P P in any desired position.

Q is a lever for moving slat P P, the lower end of which is pivoted to the projection R by pin 6.

9 is a vertical slot in the end of P P for pin 5 of lever Q to traverse in and allow the slat to rise and fall.

T T T T is a board, one side of which is flat and smooth, for the seed to drop on and be scattered in broadcast sowing, the other side being furnished, as seen in Fig. 1, with the tubes V V V for conducting the seed in drill-sowing. The board T T T T is supported on journals $u$, which pass through the stud U.

W is a lever, fast to the journal $u$, by means of which the board T T T T may be turned so as to have the seed from the hopper drop either into the drill-tubes V V V, as represented in Fig. 1, or so as to drop upon the opposite side of the board and be scattered in all directions.

9 9 is a pin projecting downward from frame A, its object being to hold the board T T T T at the requisite angle and prevent it from tipping too far on either side.

S is a hole in the frame A, from which may be suspended a bush or some other device in common use for raking in and covering the grain.

What I claim as my invention, and desire to secure by Letters Patent, is—

1. The use of fluted conical valves, constructed substantially as set forth, and vibrating, as described, for the purpose of agitating the seed.

2. The devices for simultaneously raising or depressing said valves in order to regulate the amount of seed discharged, and also for stopping the flow of seed, said devices consisting substantially of the slat P P, (the lower sides of whose extremities are wedge shape at 2 2 and 3 3, said slat being moved by the lever Q and held in place by the set-screw $z$,) and the reciprocating slat N N, resting on P P and furnished with holes 7 for receiving and vibrating the adjustable-pins J, which support the valves.

JOHN CRITCHERSON.

Witnesses:
R. B. FITTS,
N. AMES.